United States Patent [19]
Hönel et al.

[11] Patent Number: 5,066,758
[45] Date of Patent: Nov. 19, 1991

[54] CARRIER RESIN FOR PIGMENT PASTES, AND ITS PREPARATION AND USE

[75] Inventors: Michael Hönel; Peter Ziegler, both of Mainz; Walter Sprenger, Dieburg; Wolfgang Wendt, Wuppertal, all of Fed. Rep. of Germany

[73] Assignee: Hoechst AG, Fed. Rep. of Germany

[21] Appl. No.: 385,908

[22] Filed: Jul. 26, 1989

[30] Foreign Application Priority Data

Jul. 28, 1988 [DE] Fed. Rep. of Germany ....... 3825584

[51] Int. Cl.$^5$ .............................................. C09D 17/00
[52] U.S. Cl. ........................................ 528/45; 528/69; 524/901
[58] Field of Search ..................... 528/45, 69; 524/901

[56] References Cited

U.S. PATENT DOCUMENTS

| | | | |
|---|---|---|---|
| 3,936,405 | 2/1976 | Sturni et al. | 260/29.2 |
| 4,007,154 | 8/1975 | Schimmel et al. | 524/901 |
| 4,327,200 | 4/1982 | Leitner et al. | 525/531 |
| 4,431,781 | 2/1984 | Paar | 525/502 |

FOREIGN PATENT DOCUMENTS

| | | |
|---|---|---|
| 0028402 | 10/1980 | European Pat. Off. . |
| 0076955 | 9/1982 | European Pat. Off. . |
| 0107088 | 9/1983 | European Pat. Off. . |
| 0107089 | 9/1983 | European Pat. Off. . |
| 0107098 | 9/1983 | European Pat. Off. . |

Primary Examiner—Maurice J. Welsh
Assistant Examiner—Rachel Johnson
Attorney, Agent, or Firm—Bierman and Muserlian

[57] ABSTRACT

Carrier resin for pigment pastes, and its preparation and use

The invention relates to paste resins based on epoxide compounds, containing (a) specific quaternary ammonium groups, (b) OH groups and (c) isocyanate radicals which are bonded to the epoxy compound and of which at least 10 mol % are derived from a long-chain, monofunctional isocyanate having at least 8 carbon atoms, the average molecular weight (Mn) of these paste resins being 500 to 10,000. The invention furthermore relates to the preparation of these paste resins, to their use for pigment pastes and to these pigment pastes. Water-dilutable paints, in particular electrocoating paints which contain the pigment pastes according to the invention, give trouble-free surfaces and comparable film thicknesses, even on different substrates.

25 Claims, No Drawings

CARRIER RESIN FOR PIGMENT PASTES, AND ITS PREPARATION AND USE

DESCRIPTION

In the paint industry it is generally customary in the manufacture of pigmented paints to grind the pigments in some of the binder intended for use as paint binder or in special binders (paste resins or pigment carrier resins). These so-called grinding pastes (or pigment pastes) are then applied as paint together with the remaining binder.

Such grinding pastes are particularly necessary for use with low-solvent electrocoating (EC) paints, since 1. high-pigmented grinding pastes with a low solvent content do not lastingly affect the solvent balance;

2. in the operation of the EC bath it has been found advantageous to carry out the addition of the subsequent materials in two separate components, viz. a high-pigmented colored component and a clearcoat component. Any desired automatic control of the bath operation is thereby considerably facilitated;

3. pigments cannot usually be incorporated directly in an aqueous dispersion or in an EC bath. The reasons for this are many. On the one hand, (inadequately wetted) pigments tend to agglomerate in aqueous systems and to form correspondingly inadequate precipitates on the deposited films (in particular on horizontal areas of the workpiece). On the other hand, pigments must be very finely ground (<10 μm, preferably <3 μm) to be able to form stable pigment dispersions at a corresponding wetting.

The paste resins used for grinding pastes of this type must possess a number of characteristics. One important such characteristic is good wetting power toward the particular pigments. They must furthermore be fully compatible with the principal binder and they must not significantly alter the characteristics of the principal binder when used in the required amount. In addition, these paste resins should have a relatively low viscosity. Furthermore, even high-pigmented grinding pastes with a pigment/binder ratio (PBR) of >2:1, preferably >6:1 and particularly >12:1, should have a long shelf life, i.e. the pigments should not sediment or form agglomerates. Nor should the pastes thicken (for example owing to developments of structural viscosity or thixotropy), since in practice they must remain pumpable over an extended period of time. It is furthermore advantageous to employ as special paste resins binders which are depositable under the conditions prevailing in EC. This avoids enrichment of the bath and thus effluent contamination. Also the paste resins deposited in this manner must not be detrimental to film flow-out (for example by cratering) and curing.

AT patent 380,264 describes paste resins which are obtained by targeted modification of low-molecular diepoxide or polyepoxide compounds comprising oxazolidine groups. These systems are distinguished by high pigmentation, but they tend to develop thixotropy and structural viscosity on ageing.

EP Offenlegungsschriften 028,402 and 0,076,955 likewise disclose binders bearing oxazolidine groups; however, a PBR of 3:1 cannot be exceeded without agglomeration.

U.S. Pat. No. 3,936,405 describes modified epoxy resins bearing onium groups, particularly quaternary ammonium groups, as advantageous paste resins. The grinding pastes obtainable therefrom allow a PBR of about 4:1 to be reached (Example XI).

EP Offenlegungsschriften 107,088, 107,089 and 107,098 likewise disclose synthetic resins which bear quaternary ammonium groups and can be used as higher pigmentable paste resins (PBR ≧20:1). These paste resins have the drawback, inter alia, that different film thicknesses and surface qualities occur on different substrates despite identical deposition conditions.

The substrates particularly used in the automotive industry are blank steel, zinc phosphated steel, hot-galvanized or electro-galvanized steel panels and aluminium. The important criterion is that, apart from defect-free surfaces (for example the L-shaped panel test; no graining; no peaks or spots inter alia), comparable film thicknesses are also achieved. On aluminium in particular, known paste resins tend to form films which are thick and hence often porous.

EP Offenlegungsschrift 203,204 finally describes paste resins which are products of a reaction of aliphatic polyepoxides with polyether amines. Paste resins of this composition have a particularly good antifoam effect. On the other hand, they cannot reach very high and stable degrees of pigmentation (PBR). In addition, the EC dispersions require special anticratering agents where the above binder combinations are used.

It has now been found, surprisingly, that the foregoing drawbacks may be substantially avoided by using paste resins based on modified epoxy compounds with quaternary ammonium groups.

The invention therefore relates to paste resins based on epoxy compounds, these paste resins containing (a) quaternary ammonium groups of the formula (Ia)

in which the radicals $R^1$ to $R^3$ independently of one another represent a hydrocarbon radical having 1 to 7 carbon atoms, optionally carrying OH groups and/or amino groups and/or containing oxygen atoms, or two of these radicals form a cycloaliphatic ring, and/or quaternary ammonium groups of the formula (Ib)

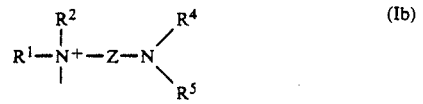

in which the radicals $R^1$ and $R^2$ have the meaning above, represents a linear, branched or cyclic alkylene radical having 2 to 18 carbon atoms, which may optionally carry OH groups and/or contain oxygen atoms, and $R^4$ and $R^5$ independently of one another denote a hydrocarbon radical having 2 to 50 carbon atoms, which may optionally carry OH and/or silane groups and/or contain oxygen atoms, or one of the two radicals $R^4/R^5$ may form a ring preferably having 4 to 6 carbon atoms with Z, (b) OH groups and (c) isocyanate radicals which are bonded to the epoxy compound, and of which at least 10 mol-%, preferably at least 20 mol-% and, in particular, 50–100 mol-% are derived from a long-chain, monofunctional isocyanate (D1) having at least 8 carbon atoms,
the mean molecular weight ($\overline{M}_n$; determined by means of gel chromatography; PS Standard) of these paste resins being 500 to 10,000.

The subject matter of the invention is furthermore a process for the preparation of these paste resins, their use in pigment pastes as well as these pigment pastes.

The paste resins according to the invention preferably have an average molecular weight ($\overline{M}_n$) of 1,000 to 5,000. The OH values are at most 10 to 200, preferably 20 to 90 mg of KOH/g, the epoxy numbers are at most below 0.5, preferably between 0 and 0.3, and the amount of quaternary nitrogen per gram is generally 0.2 to 20, preferably 0.8 to 5 milliequivalents.

The number of groups (a) per molecule (statistical average) is generally between 1 to 4, preferably 2 or 3, that of (b) is between 1 and 20, preferably 2 to 8 and that of (c) is between 1 to 15, preferably between 1 and 6, and in particular between 2 and 4. The number of groups (c) is in this case within the foregoing ranges dependent on the chain length of the isocyanate (D1), it being possible for this number to be correspondingly lower, the longer the chain length of this isocyanate.

The radicals $R^1$ to $R^3$ in the above formula (Ia) preferably denote a linear alkyl radical having 1 to 7, preferably 1 to 4 carbon atoms, which can optionally carry OH groups, or a cycloalkyl radical preferably having 5 or 6 carbon atoms, which can contain hetero atoms such as oxygen, or a polyoxyalkyl radical having up to 7 carbon atoms, preferably 2 to 4 carbon atoms. $R^1$ to $R^3$ may furthermore also represent araliphatic radicals having 7 carbon atoms or aryl radicals having 6 or 7 carbon atoms, although these radicals are less preferred.

Examples of radicals of this type which may be mentioned here are:

Methyl, ethyl, propyl (n- or iso), butyl(n- or iso) and higher homologs up to and including heptyl, cyclopentyl, cyclohexyl, tetrahydrofurfuryl, benzyl, furfuryl, phenyl, 2-hydroxyethyl, 3-hydroxypropyl and 5-hydroxy-3-oxopentyl; furthermore N-methylpiperidine and N-methylmorpholine, the piperidine or morpholine ring being formed from two of these radicals $R^1$ to $R^3$. Particularly preferred in this connection are smaller, sterically less effective radicals such as methyl, ethyl, propyl, hydroxyethyl and hydroxypropyl.

The radical Z in the above formula (Ib) preferably has 3 to 9 carbon atoms. Examples which may be mentioned here are the ethylene, propylene, butylene, trimethylhexamethylene and cyclohexylene radical.

The radicals $R^4$ and $R^5$ preferably denote a hydrocarbon radical having 20 to 42 carbon atoms, preferably an alkyl radical or a polyoxyalkyl radical which preferably carries OH groups. Possible silane groups which may be attached to these radicals are, for example, alkoxysilane groups, such as the trimethoxysilane group. The ring formed from $R^4$ or $R^5$ and Z is preferably the pyrrolidine or the piperidine ring.

Preferably, the paste resins according to the invention contain both groups (Ia) and (Ib) and particularly preferably only the groups (Ia).

The isocyanate radicals (c) in the formula (I) are derived primarily from the long-chain monoisocyanates (D1) described in greater detail below, i.e. from monoisocyanates usually having 8 to 22 carbon atoms, preferably 10 to 20 carbon atoms and particularly 12–18 carbon atoms, which from the very beginning contain only one isocyanate group, and/or from diisocyanates or polyisocyanates having one free isocyanate group whose remaining isocyanate group(s) is(are) stably masked (i.e. it does not or they do not become demasked on curing) and whose total number of carbon atoms is generally about 10 to 50, preferably 15 to 50, and in particular 20 to 40.

In contrast, the paste resins, especially if they are self-curing, can also contain other isocyanate radicals which are derived from optionally shorter-chain, partly masked diisocyanates or polyisocyanates (D2), which under the curing conditions lose their masking groups.

The term "isocyanate radical" (urethane radical) is understood to be the group

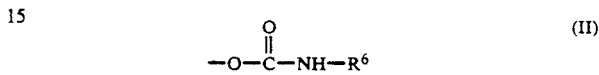

(II)

in which $R^6$ denotes a hydrocarbon radical particularly of an aliphatic or araliphatic character having 6 to 50, preferably 10 to 40 and particularly 10 to 30 carbon atoms, which radical can be optionally interrupted by heteroatoms (O, NH, NR) or groups such as

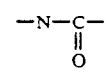

In the case of the (partly) masked polyisocyanates, $R^6$ also carries one to five, preferably one to three, masked isocyanate groups. In this variant this radical $R^6$ can also be aromatic and then has not more than 6 to 25, preferably 6 to 15, carbon atoms.

These isocyanate radicals are derived from the isocyanates (D1) and, if appropriate, (D2) described below, the amount of (D1) and, if appropriate, (D2) generally being 3 to 50% by weight, preferably 10 to 45% by weight, and in particular 15–35% by weight, relative to the paste resin.

The proportion of (D1) therein is at least 10%, preferably at least 20%, and in particular 50 to 100%.

The preparation of the paste resins according to the invention can be carried out in that compounds (B) which contain at least one 1,2-epoxy group and OH groups are first made to react with long-chain, monofunctional isocyanates (D1), if appropriate mixed with partly masked isocyanates (D2), and this reaction product is then reacted with amines (A) under conditions which lead to quaternary amino groups.

Alternatively, the addition of (A) and (B) can be carried out first, (B) not necessarily needing to contain OH groups, after which this reaction product (C) is then reacted with the isocyanates (D1) and, if appropriate, (D2), and the quaternization is carried out subsequently thereto.

Suitable amines (A), whose total carbon number is in general 2 to 21, preferably 3 to 12, are preferably those of the formula (III) below

(III)

in which $R^1$ and $R^2$ are as defined in formula (Ia) above and X preferably stands for $R^3$ (see also formula (Ia)) or hydrogen. In the latter case, the amines according to formula (III) are thus secondary, and a subsequent quaternization of the adduct from (A) and (B) is still necessary.

Examples of the tertiary amines preferably employed are (with low-boiling amines, the apparatus is also correspondingly to be designed as pressure-resistant): trimethylamine, triethylamine, tripropylamine, tributylamine and higher homologs (linear, branched or cyclic), N,N-dimethylethanolamine, triethanolamine, N-methyldiethanolamine, N-methylpiperidine, N-methylmorpholine, N-benzylpiperidine, N-phenylmorpholine, N-methylpropylenimine, N,N-dimethylaminoethoxyethanol.

Secondary amines which may be mentioned here are: dimethylamine, diethylamine, dipropylamine, dibutylamine, etc.; diisopropanolamine, morpholine, piperidine or suitably substituted derivatives thereof.

Mixtures of the tertiary or secondary amines with one another, and in special cases even of the tertiary amines and of the secondary amines, can be used.

Mixed with the monoamines of the above formula (III) or, less preferably, even alone, polyamines can also be used which, in addition to a tertiary amino group, still contain at least one secondary amino group. Furthermore, polyamines are also possible here which, in addition to a tertiary and/or secondary amino group, still contain at least one primary amino group which, however, must be blocked, for example as the ketimine. These ketimines can be deblocked in acidic medium in the presence of water and in this manner form reactive curing centers in the paste resin.

In cases in which the addition of (A) and (B) does not take place via a tertiary amino group, the quaternization is carried out subsequently.

Suitable polyamines are, for example: N,N-bisaminopropyl-N-methylamine, N,N-dimethyl(diethyl)propylamine, N,N-dimethylaminoneopentaneamine, and also oxadiamines such as 4-oxaheptanediamine.

If mixtures of monoamines and polyamines are used, the proportion of monoamines is generally 10 to 90%, preferably 50 to 75%, relative to the mixture.

Suitable amines (A) which lead to the groups according to formula (Ib) are preferably those which are reaction products of prim./tert. and/or sec./tert. diamines with epoxy compounds. The latter are preferably monoepoxides. Examples of diamines of this type are: N,N-dimethylaminopropylamine, N,N-diethylaminopropylamine, N,N,N'-trimethylethylenediamine, N,N-dimethylaminoneopentaneamine, N,N-diethyl-1,4-pentanediamine, 4-dimethylaminopiperidine and 4-dimethylamino-2,2,6,6-tetramethylpiperidine. Examples of the monoepoxide compounds preferably employed here are: ethylene oxide, propylene oxide, butene oxide and higher acyclic or cyclic homologs, such as, for example, octadecene-1-oxide, cyclopentene oxide, and epoxide compounds having other heteroatoms, such as, for example: γ-glycidyloxypropyltrimethoxysilane, phenyl glycidyl ether, methyl glycidyl ether, stearyl glycidyl ether, 2-ethylhexyl glycidyl ether, phenol-(EO)$_5$ glycidyl ether, p-t-butylphenyl glycidyl ether, p-octylpheyyl glycidyl ether and lauryl-(EO)$_5$ glycidyl ether.

Any materials can be employed as compounds (B), if they contain on average at least one, preferably two or three 1,2-epoxy group(s) per molecule and have no other functional groups which perturb the reaction with the component (A). The molecular weight $\overline{M}_n$ (number average, determined using gel chromatography, PS standard) should in general be between 100 and 10,000, preferably between 150 and 3,500, and the epoxide equivalent weight should be between 100 and 10,000, preferably 150 and 1,500. The epoxide groups are preferably terminal, but in some cases compounds which contain these groups randomly distributed along the chain of the molecule and which can be prepared by copolymerization using olefinically unsaturated compounds containing these epoxide groups, can be used as component (B).

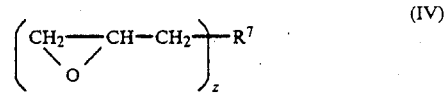

The component (B) preferably has the general formula (IV)

$$\left( CH_2 \underset{O}{\overset{}{\diagdown\!\!\!\diagup}} CH-CH_2 \right)_{\!\!z}\!\!-R^7 \qquad (IV)$$

in which

R$^7$ denotes a z-valent radical of a polyether, polyether polyol, polyester, polyester polyol which can also optionally contain (NR$^8$) groups, R$^8$ representing hydrogen, alkyl of 1 to 14, preferably 1 to 8 carbon atoms or hydroxyalkyl of 1 to 14, preferably 1 to 8 carbon atoms, and these radicals generally having average molecular weights $\overline{M}_n$ of 200 to 5,000, preferably 200 to 2,000, or a z-valent hydrocarbon radical, preferably an alkylene radical of 2 to 18 carbon atoms which can optionally carry inert or non-interfering groups, or a z-valent poly(sec.)amine radical or the z-valent radical of a reaction product of an epoxy compound with polyamines, polyols, polycaprolactone polyols, OH group-containing polyesters, polyethers, polyglycols, hydroxylfunction-, carboxyl function- and amino function-containing polymeric oils having average molecular weights M$_n$ of 800 to 10,000, polycarboxylic acids, hydroxyl function- or amino function-containing polytetrahydrofurans, or of reaction products of polyamines with glycidyl esters of α,α-dialkylalkanemonocarboxylic acids having the empirical formula C$_{12-14}$H$_{22-26}$O$_3$ or with glycidyl versatate, these reaction products generally having average molecular weights M$_n$ of 300 to 12,000, preferably 400 to 5,000, z denotes 1 to 5.

In this formula (IV) the index z preferably represents 2 or 3, particularly 2.

"Radical" in the foregoing sense may here be understood to mean the particular compound (for example polyether) less the active H atoms of those groups which adjoin the CH$_2$ group in formula (IV).

In particular, these compounds (B) are polyglycidyl ethers based on polyhydric, preferably dihydric, alcohols, phenols, hydrogenation products of these phenols and/or of novolaks (reaction products of mono- or polyhydric phenols with aldehydes, in particular formaldehyde, in the presence of acidic catalysts) which are obtained in a known manner by reacting the particular polyols with epichlorohydrin.

Examples of polyhydric phenols which may mentioned here are: resorcinol, hydroquinone, 2,2-bis(4-hydroxyphenyl)propane (bisphenol A), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxydiphenyl, 4,4'-dihydroxybenzophenone, bis(4-hydroxyphenyl)-1,1-ethane, bis(4-hydroxyphenyl)-1,1,-isobutane, bis(4-hydroxy-tert.-butylphenyl)-2,2-propane, bis(2-hydroxynaphthyl)methane, 1,5-dihydroxynaphthaline, tris(4- hydroxyphenyl)methane and bis(4-hydroxyphenyl)-1,1,-ether. Bisphenol A is preferred in this case. Preferably, free hydroxyl groups are contained in addition to the epoxy groups in the polyglycidyl ether of the polyphenol. Diglycidyl adducts of (cyclic) ureas can also be employed in this connection.

The polyglycidyl ethers of polyhydric alcohols are also suitable. Examples of polyhydric alcohols of this type which may be mentioned are ethylene glycol, diethylene glycol, triethylene glycol, 1,2-propylene glycol, polyoxypropylene glycols (n=1-10), 1,3-propylene glycol, 1,4-butylene glycol, 1,5-pentanediol, 1,6-hexanediol, 1,2,6-hexanetriol, glycerol and bis(4-hydroxycyclohexyl)2,2-propane.

If epoxide compounds originally contain no OH groups or only have a low molecular weight or if a modification is necessary for the purpose of flexibility, remedial action can be taken here, for example, by conversion of epoxide compounds of this type, which for this purpose must contain at least 2 epoxide groups, using suitable difunctional compounds. Possible difunctional compounds of this type are, for example, diamines, even in the form of amine-epoxide adducts having terminal amino groups, aliphatic or aromatic diols (for example those mentioned above), polymers such as polyesters, polyethers, polyether polyesters having terminal OH groups, as well as dicarboxylic acids and the like. The reaction is in this case carried out in such a way that the resulting reaction product contains at least one, preferably two or three epoxy group(s).

A detailed enumeration of the suitable epoxide compounds is found in the handbook "Epoxidverbindung und Epoxidharze" (Epoxide Compounds and Epoxy Resins) by A. M. Paquin, Springer Verlag, Berlin 1958, Chapter IV and in Lee, Neville "Handbook of Epoxy Resins", 1967, Chapter 2. Mixtures of a number of epoxide compounds may also be used.

The compounds (B) containing OH groups preferably employed are preferably reacted with the isocyanates ($D_1$)/($D_2$) before reaction with the amines (A), either only a part or all of the OH groups being made to react. Alternatively, it is also possible with compounds (B) containing OH groups first to react the reaction product (C) with these isocyanates. If the compounds (B) contain no OH groups, but these are formed only on addition of the amine (A), only this alternative is possible.

The reaction of the compound (B) with the isocyanates ($D_1/D_2$) is carried out under the conditions customary for reactions of this type, expediently at 30° to 80° C., and in the presence of inert, preferably aprotic, solvents. The reaction is discontinued on attaining a % NCO content of <0.2. Catalysts, such as those customary for urethane formation, can be added to the reaction mixture. Those which may be mentioned here are, in particular, metal salts and chelates, for example lead acetate, dibutyltin dilaurate, tin octoate and the like; basic catalysts such as tertiary amines are also suitable in this connection.

Suitable solvents for the above reaction are preferably aprotic and, if appropriate, polar solvents. Examples which may be mentioned here are: halogenated hydrocarbons (less suitable when used as coating paint), N-methylpyrrolidone, ethers such as diethyl ether, 1,2-dimethoxyethane, tetrahydrofuran or dioxane; ketones such as, for example, acetone, methyl ethyl ketone, methyl isopropyl ketone, methyl isobutyl ketone, cyclohexanone and the like; esters (less suitable when used as coating paint), such as butyl acetate, ethyl glycol acetate, methoxypropyl acetate; (cyclo)aliphatic and/or aromatic hydrocarbons, such as hexane, heptane, cyclohexane, benzene, toluene, the different xylenes as well as aromatic solvents in the boiling range from about 150° to 180° C. (higher-boiling mineral oil fractions, such as ®Solvesso). The solvents may in this case be employed individually or as a mixture.

The long-chain monoisocyanates ($D_1$) which are primarily intended to impart an adequate measure of lyophilic character in addition to a degree of flexibility to the compounds according to the invention, usually have at least 8 carbon atoms, preferably 8 to 22 carbon atoms, and in particular 12 to 18 carbon atoms; their hydrocarbon radical preferably possesses aliphatic or araliphatic character. Examples here are octadecyl isocyanate, dodecyl isocyanate, nonylphenyl isocyanate etc.

Less preferred in this respect are also partly masked polyisocyanates still having a free NCO group and having a total carbon number of at least 10, preferably 15 to 50 and, in particular, 20 to 40, which can optionally also be employed mixed with the above monoisocyanates. Those shown below in ($D_2$) can be used, for example, as polyisocyanates, preferably diisocyanates. Correspondingly longer-chain compounds which are virtually not split off during the curing of the paint film under the conditions according to the invention are suitable for masking. The isocyanates partly masked in this way thus impart virtually no self-curing properties to the paste resins. Examples of masking agents of this type are: fatty amines, such as tallow fatty amine, octadecylamine or dodecylamine, nonylamine, isononyloxypropylamine or correspondingly derived alcohols, for example octadecyl alcohol, decanol and the like.

If the binders according to the invention are intended to be self-curing, partly masked isocyanates ($D_2$) may be also be introduced which may have a shorter chain length and are unmasked under the baking conditions. Suitable polyisocyanates here are any polyisocyanates known in the polyurethane or paint field, for example aliphatic, cycloaliphatic or aromatic polyisocyanates.

Typical examples of such polyisocyanates are: xylylene diisocyanate, diphenylmethane-4,4-diisocyanate, triphenylmethyl-4,4'-triisocyanate, triphenylmethane triisocyanate, polyphenyl polymethylisocyanate, 2,2,4(2,4,4)-methylcyclohexyl diisocyanate, dicyclohexylmetyyl diisocyanate, diethylfumarhexyl isocyanate, bis(3-methyl-4-isocyanatocyclohexyl)methane, 2,2-bis(4-isocyanatocyclohexyl)propane, methyl ester of lysine diisocyanate, the biuret of the hexamethylene diisocyanate, diisocyanates of dimeric acids, 1-methylbenzene-2,4,5-triisocyanate, bisphenyl-2,4,4'-triisocyanate, the triisocyanate obtained from 3 moles of hexamethylene diisocyanate and 1 mole of water having a 16% NCO content, and other compounds containing at least two NCO groups per molecule, preferably isophorone diisocyanate, hexamethylene diisocyanate, trimethylhexamethylene diisocyanate and tetramethylhexamethylene diisocyanate, but in particular 2,4-toluylene diisocyanate or 2,6-toluylene diisocyanate or mixtures of these compounds.

In addition to these simple polyisocyanates, those isocyanates are also suitable which contain heteroatoms in the radical linking the isocyanate groups. Examples of these are polyisocyanates which comprise carbodiimide groups, allophanate groups, isocyanurate groups, urethane groups, acylated urea groups or biuret groups.

Finally, suitable polyisocyanates are also the known prepolymers containing terminal isocyanate groups, available in particular by the reaction of the simple polyisocyanates mentioned above, especially diisocyanates, with excesses of organic compounds having at least two groups reactive toward isocyanate groups. These prepolymers, however, are preferably used as external curing components in non-self-curing systems.

The masking agents should be such that at the preferred curing temperatures of 130° to 180° C., in the presence or absence of catalysts known for this purpose, they again split off.

Examples of such masking agents are: aliphatic, cycloaliphatic or alkylaromatic (monohydric) alcohols, for example lower aliphatic alcohols such as methyl and ethyl alcohol, the various propyl, butyl and hexyl alcohols, heptyl, octyl, nonyl, decyl, propargyl and decylal alcohol and the like; methoxy-1-propanol and methoxy-2-propanol; also unsaturated alcohols such as allyl alcohols, cycloaliphatic alcohols such as cyclopentanol, cyclohexanol, alkylaromatic alcohols such as benzyl alcohol, methylbenzyl alcohol, p-methoxybenzyl alcohol and p-nitrobenzyl alcohol and monoethers of glycols, such as ethylene glycol monoethyl ether, ethylene glycol monobutyl ether and the like. Further masking agents are ketoximes, expediently those having 3 to 20 carbon atoms, preferably 3 to 10 carbon atoms, such as acetoxime, methyl ethyl ketoxime (=butanoxime), hexanoxime (such as methyl butyl ketoxime), heptanoxime (such as methyl n-amyl ketoxime), octanoxime and cyclohexanoxime, CH-acid compounds such as alkyl malonates, acetoacetic esters such as cyanoacetic esters having in each case 1 to 4 carbon atoms in the ester group, NH-acid compounds such as caprolactam, amino alcohols such as diethylethanolamine, and special amines such as dibutylamine. 2-ethylhexanol, butyl diglycol, butyl glycol, 3-methyl-3-methoxybutanol and pyridinyl carbinol are preferred.

Examples of suitable demasking catalysts are lead octoate, lead silicate, lead naphthenate, zinc compounds according to the DE Offenlegungsschriften 2,807,698 and 3,306,064, zinc compounds and zinc-lead compounds of nitrophthalic acid, complex compounds obtained from zinc oxide and 8-hydroxyquinoline (also usable in situ), antimony trioxide, manganese (II) and manganese (III) acetylacetonate, manganese phosphate, manganese-zinc phosphate, cobalt naphthenate, cadmium acetylacetonate, thallium dicyclopentadiene, triethanolamine titanate or organic compounds of tin, for example dibutyltin dilaurate and preferably dibutyltin oxide.

The reaction of amine (A) with the epoxide compound (B) preferably already reacted with the isocyanates (D1)/(D2) to give the quaternary paste resins of the invention is generally carried out at temperatures from 20° to 100° C., preferably 50° to 100° C. and, in particular, 70°–90° C. in the presence of water-containing and preferably organic acids. In this case, the presence of an organic solvent is generally advantageous. (A) and (B) are generally employed in such amounts that the equivalent ratio of amino groups reacting with epoxy groups to epoxy groups is 0.7–1.5 to 1, preferably 0.8–1.3 to 1 and in particular 0.9–1.1 to 1.

The acids employed in this case generally have a $pK_a$ value of $\leq 6$ and are expediently easily miscible with water. Examples of these are inorganic acids such as phosphoric acid; however, preferred acids in this case are organic acids, such as formic acid, acetic acid and, particularly preferably, lactic acid. It is also possible, for example, to carry out the reaction of (A) with (B) under neutral conditions first and only then to add the acid.

Suitable solvents are basically the aprotic and polar systems described above for the reaction of (B) with (D1)/(D2). However, the solvents used here are preferably protic; these include, inter alia, butyl glycol, butyl diglycol, methoxypropanol and ethoxypropanol. The amount of organic solvent in the quaternization mixture depends on the amine (A) and the amount of water and should be proportioned so that the mixture is homogeneous.

In a preferred embodiment of the process according to the invention, a mixture of amine (A) (1 mole per mole of epoxide group), 1 mole of lactic acid/mole of tertiary amine and 0.5 to 20, preferably 2 to 10 moles of deionized water per tertiary amine is added, for example, to the reaction product of the epoxy compound (B) and the isocyanates (D1)/(D2) and the organic solvent. The reaction is carried out until the acid number is < 10. If appropriate, the reaction can also be carried out in this case using an excess of amine which, after quaternization, is removed by distillation (up to 1.5 moles of amine/mole of epoxide group).

In the case in which amines having secondary or primary amino groups are employed as amines (A), the reaction product resulting with (B) is preferably still subsequently quaternized in an extra step. When using a subequivalent amount of amine (A), this quaternization can also be carried out by means of the excess epoxide compound (B); however, in this case the risk of gelling exists so that this route is less advantageous.

For quaternization by means of a separate quaternizing agent, basically all known methods can be used such as those, for example, described in DE Offenlegungsschrift 2,641,286. However, the nature of the counter ions introduced may lead to limitations. Thus, quaternizing methods for paste resins according to the invention to be used in electrocoating paints cannot be employed if they introduce halogen anions, since these lead to pronounced anode corrosion. This is true, for example, in the case of quaternization using alkyl halides (iodides), but not, however, when using dialkyl sulfates or trialkyl phosphates.

This quaternization is preferably carried out by reacting (C) with monoepoxide compounds, for example ethylene oxide, propylene oxide, 2-ethylhexyl glycidyl ether, glycidyl versatate, glycidyl phthalimide, phenyl glycidyl ether, methylglycidyl ether, phenol-(EO)$_5$ glycidyl ether under the conditions described above and at temperatures preferably from 40°–90° C. (cf. in this connection also Houben-Weyl, vol. XI/2, p. 609 ff (1958)).

In the case of easily volatile epoxide compounds, the mixture of lactic acid, water and solvent is added first and the epoxide compound (ethylene oxide, propylene oxide etc.) is subsequently introduced with occasional cooling (pressure-resistant apparatus).

The compounds quaternized in this manner are highly suitable for use as paste resins for pigment pastes and pigment dispersions, pigment:paste resin ratios of 1:1 to 40:1, preferably 12:1 to 20:1 being possible, depending on the type of pigment, its primary particle size etc. Apart from the paste resin according to the invention and the pigment, these pigment pastes may also contain the customary additives, such as fillers, other auxiliary substances commonly added to paints (dispersants, wetting agents, solvents, plasticizers, antifoams, etc.) and also optionally a part or all of the known curing catalysts.

Suitable pigments are those commonly used for this purpose, for example titanium oxide (usually the main component), other white pigments and extenders, such as antimony oxide, zinc oxide, basic lead carbonate or lead silicate and/or lead sulfate, barium carbonate, clay, calcium carbonate, aluminum silicate, silica, magnesium carbonate and/or magnesium silicate; furthermore (additional) colored pigments such as phthalocyanine blue, hydrated iron oxides, chrome yellow, carbon black, toluidine red and manganese dioxide.

The water content of such pigment pastes depends on the viscosity desired for the processing and usually is between 10 and 70%.

If appropriate, the pigment paste can also be diluted before use. The solid content (125° C./1 h) of pigment pastes of this type is generally adjusted to 50 to 90, preferably 60 to 85% by weight.

The preparation of pigment pastes of this type is carried out in a known manner, such as described, for example, in DE-Offenlegungsschrift 3,726,497 or in DE Offenlegungsschrift 2,634,229.

Comminution of the pigment is usually performed in ball mills, sand mills, Cowles dissolvers or continuous trituration equipment, until the pigment has been reduced to the desired particle size; it is then wetted by the carrier resin or dispersed in it. After the comminution the particle size of the pigment should be in the region of 10 micrometers or less, preferably as small as possible. The pigment is generally reduced to a fineness of less than 3 $\mu$m (measured by laser aerosol spectroscopy), preferably in the presence of glass beads, $Al_2O_3$ (corundum) beads, ceramic beads or $ZrO_2$ beads (diameter 0.5–3 mm).

The foregoing pigment dispersions (pigment pastes) are then added with mixing in the usual manner and in sufficient amounts to the water-thinnable paint, in particular electrocoating paint. The finished, electrically depositable composition generally has a pigment to binder (=electrically depositable resin plus paste resin) ratio of 0.05:1 to 0.8:1.

Suitable film-forming resins for these paints are the products known for this purpose, such as those described, for example, in DE-Offenlegungsschriten 3,644,371, 3,726,497 and 3,809,655 as well as in EP Offenlegungsschrift 234,395. Other resins suitable for this purpose are disclosed in the Journal of Coatings Technology, vol. 54, No. 686, (1982), pp. 33 to 41 ("Polymer Compositions for Cationic Electrodepositable Coatings"), to which reference is also made.

The electrical deposition of the paint particles from the electrocoating paints is carried out by known methods to which reference is made here. The deposition can take place on all electrically conducting substrates, for example metals such as steel, copper, aluminum and the like.

After deposition, the coating is cured by usual processes at elevated temperatures which generally depend on the nature of tho curing components, temperatures of 100° to 220° C., preferably 130° to 180° C., being used.

The resulting coatings are distinguished particularly by an outstanding resistance to salt spray (ASTM-B-117-64; 960 hours on zinc phosphated and blank steel panel). Owing to the conversion of the quaternary ammonium structure into a tertiary amine, on baking, the paste resins according to the invention furnish no cleavage products which lead to chain termination. A reduction of the polarity of the paint film with its consequent increase in water resistance is also linked to this conversion.

EXAMPLES

All indications of quantities are in parts by weight.
The sieve residue and the L-shaped panel coating were determined or performed as follows:

Sieve Residue 1 liter of the diluted paint solution is poured through a weighed perlon sieve (mesh size 30 $\mu$m). The sieve is rinsed with deionized water and weighed after drying (1 h/125° C.). The result is reported in mg of residue (based on 1000 ml of the bath).

L-Shaped Panel Coating

A zinc phosphated steel panel (about 10×20 cm) is bent at a right angle at its lower end (a 3 cm horizontal area). The panel is immersed in the coating bath in such a manner that the horizontal arm of the L is about 15 cm below the surface of the paint bath. The coating is carried out with the mixing action switched off and with a coating time of 4 minutes. At the end of the coating period the panel remains in the bath for a further 2 minutes. The panel is subsequently withdrawn from the bath, after a further 2 minutes rinsed with water and baked. The panel is visually assessed for flow-out, luster and sedimentation phenomena.

I. Preparation of the Paste Resin According to the Invention

A) Paste Resin Containing Group (Ia)

1. 960 parts (2 equivalents of epoxide) of Epikote ® 1001 were dissolved in 388 parts of N-methylpyrrolidone and the mixture was warmed to 80° C. 590 parts (2 equivalents of NCO) of octadecyl isocyanate were allowed to run into this well homogenized mixture in the course of one hour. After a further 3 hours, the % NCO value had fallen to virtually 0. The product solution was about 80% strength (1 h, 125° C.) and had an epoxide number of 2.1.

2. 118 parts (2 mol) of triethylamine were allowed to run into 36 parts of demineralized water and 200 parts of lactic acid (90% strength) with cooling. 20 parts of butyl glycol were then added to the solution.

3. The quaternization mixture obtained under I.2. was allowed to run into the reaction mixture obtained under I.1. The temperature rose to 70° C. during the course of this. The reaction mixture was then kept at this temperature for 5 hours (acid number practically 0), then adjusted to 75% solid with butyl glycol (1 h, 125° C. ≈152 parts of butylglycol) and diluted to 40% with demineralized water. The paste resin obtained was completely miscible with water.

B) Paste Resin Containing Group (Ib)

Example A) was repeated with the difference that the quaternization mixture described below was employed in step A)3:

854 parts (2 mol) of ®Denacol Ex 145 (phenol-(EO)$_5$ glycidyl ether) were allowed to run into a solution of 1 mol (102 parts) of N,N-dimethylaminopropylamine in 637 parts of methoxypropanol at 60°–80° C. in the course of one hour, and the mixture was held at 80°-100° C. until an epoxy number of virtually 0 had been attained (amine number about 117 mg of KOH/g of solid); about 60% strength. 3187 parts (~2 mol) of the preceding amine solution were allowed to run into 36 parts of demineralized water and 200 parts of lactic acid (90% strength) with cooling and the mixture was subsequently diluted with butyl glycol (about 64 parts) to 60%.

II. Comparison Experiment

For the comparison experiment, a pigment paste resin whose synthesis is described in EP Offenlegungsschrift 107,098 (Example II) was synthesized.

235 parts (2.3 equivalents) of dimethylaminopropylamine were allowed to run into 420 parts (2 equivalents) of coconut fatty acid at room temperature during the course of ½ hour. During the course of this, the temperature rose to about 70° C. The reaction mixture was then heated under reflux for about 2 hours at 135° to 140° C.

Water from the reaction was then removed by distillation through a water separator and, subsequently thereto, freed from excess amine in vacuo. The reaction product was cooled to room temperature, diluted with 237 parts of butyl glycol and well homogenized, then 218 parts of lactic acid (90% strength, 2.18 equivalents) were added. During the course of this, the temperature rose to about 60° C. and was held there for about 15 min. 208 parts of demineralized water was then added, the mixture was well homogenized at 60° C. for 15 min and then 439 parts (2.34 equivalents) of Epikote 828 were added rapidly. The reaction mixture was then heated to 75° to 85° C. and held at this temperature for 2 hours. The product had an acid number of about 10 mg of KOH/g of solid resin and a solid content (1 h, 125° C.) of about 62%. The binder was completely water-miscible.

III. Preparation of the Binder Dispersions (Low-Solvent Coating Paints)

1. Preparation of Partly Masked Polyisocyanates 124 parts (1.05 equivalents of OH) of butyl glycol were slowly allowed to run into 174 parts of toluylene diisocyanate (2 equivalents of NCO, 80% of 2,4-, 20% of 2,6-isomer) at 25° to 40° C. in the presence of 0.01% triethylamine as a catalyst and the mixture was reacted to give an NCO value of about 13.5–14.0%.

2. Preparation of the Curing Agents (Analogous to DE Offenlegungsschrift 3,809,695)

102.3 parts (0.55 mol) of ®Beckopox-080 (2-ethylhexyl glycidyl ether) were added in the course of 30 min. at 60° C. to 129.3 parts (0.55 mol) of DETA(EO)$_3$ (DETA(E=)$_3$ = triply ethoxylated diethylenetriamine as described in the preceding Patent Application) in 116.80 parts of N-methylpyrrolidone. The temperature rose to 80° C., and the reaction mixture was then held at 100° C. until it had attained an epoxide number of 0 (3 hours). The mixture was then diluted using 440 parts of toluene and cooled to 60° C. 819.5 parts (2.75 mol) of the partly masked polyisocyanate according to 1.1.) was then allowed to run into this mixture during the course of 30 min. and the mixture was then reacted to give a % NCO value of 0.15 during the course of 4 hours at 70° C.

The amine number of the curing agent obtained was about 57.5 mg of KOH/g. solid (1 h, 125° C.):~65%.

3. Preparation of the Binder 3.1. Based on Example VIII/26 of DE Offenlegungsschrift 3,624,454, a binder solution was prepared as follows:

832 parts of the monocarbonate of ®Epicote 828 (diglycidyl ether of bisphenol A; 2 equivalents of epoxide), 830 parts of ®Capa 205 (=polycaprolactondiol having an average molecular mass of 830) and 712 parts of toluene were mixed and made to react at 70° to 140° C. in the presence of about 0.3% boron trifluoride etherate until an epoxide number of about 0 was attained. 1497 parts of the biscarbonate of ®Epikote 1001 (2 equivalents of carbonate, 70% strength in toluene as a suspension) were then added and well homogenized, and 1192 parts of the compound according to this Example I.1. were allowed to run in at 60° to 80° C. during the course of 2 hours. The mixture was then held at 80° C. until attaining about 0% NCO.

The reaction mixture was then cooled to about 40° C., 645 parts of bishexamethylenetriamine were added and 596 parts of the compound I.1. were added again at 30° to 40° C. during the course of 2 to 3 hours; the mixture was then allowed to react at 40° C. to give a % NCO value of 0.1%.

The binder mixture thus obtained was adjusted to 66% solid using 1490 parts of methoxypropanol, warmed to about 70° C. and held there until attaining an amine value of about 33 (relative to binder solid). The mixture was then partly neutralized using 142 parts of formic acid (50% strength) to give an MEQ value of about 30 (solid 65% strength, 1 hour, 125° C.).

3.2 Analogously to EP Offenlegungsschrift 12,463 and DE Offenlegungsschrift 3,615,810:

301 parts of diethanolamine, 189 parts of N,N-dimethylaminopropylamine and 1147 parts of an adduct of 2 mol of 2-methylpentamethylenediamine and 4 mol of glycidyl versatate (Cardura ® E 10 from Shell) were added to 5273 parts of bisphenol A epoxy resin (epoxide equivalent weight 475) in 3,000 parts of ethoxypropanol. The reaction mixture was held at 60° to 90° C. for 4 hours with stirring and then at 120° C. for one hour.

It was then diluted to 65% solid using ethoxy propanol (~720 g).

Hydroxyl number: 276 mg of KOH/g of solid resin
Hydroxyl number (primary OH): 55 mg of KOH/g of solid resin
Hydrogenation iodine number: virtually zero
Amine number (tertiary amino groups): 78 mg of KOH/g of solid resin

4. Preparation of the Paint

The following dispersions (40% strength; 1 h at 125° C.) were prepared according to the recipe below from the binders described in II.3.:

TABLE 3

| Dispersion I | Dispersion II |
| --- | --- |
| 588 parts of binder 3.1 (65% strength in toluene/methoxypropanol) | 1032 parts of binder 3.2 65% strength in ethoxypropanol) |
| 588 parts of binder 3.2 (65% strength in ethoxypropanol) | |
| 363 parts of curing agent 2. (65% strength in NMP/toluene) | 506 parts of curing agent 2. 65% strength in NMP/toluene). |
| 20 parts of butyldiglycol | 20 parts of butyldiglycol |

TABLE 3-continued

| Dispersion I | Dispersion II |
|---|---|
| 17.06 parts of formic acid, 50% strength | 32.2 parts of formic acid, 50% strength |
| 1381 parts of demineralized water | 1389 parts of demineralized water |

The binder, the curing agent, the butyldiglycol and the formic acid were initially introduced and well homogenized, and 457 g of (I) or 463 g of (II) solvent was then stripped by vacuum distillation in 50 min. at temperatures from 40° to 80° C. (jacket temperature) and pressures of not less than 0.02 bar. In order to avoid foams, the pressure was only reduced correspondingly slowly in this case.

After conclusion of the distillation, the mixture was aerated and dispersed with demineralized water at 60° C. to a solid content of 40% by weight (determined at 125° C./1 h) with good stirring. The highly liquid dispersions thus obtained were filtered through a 25 μm GAF filter at 40° C.

The MEQ values were about 30 (I) and 35 (II).

IV. Testing of the Binders Prepared According to the Invention as Pigment Paste Resins a) Pigment pastes according to customary standard testing recipes were prepared from the paste resin corresponding to Example I.3. and the comparison experiment II according to the formulation below:

Pigment composition (including additives):

| A | | | B |
|---|---|---|---|
| 3.550 | (a) ®Surfynol 104/50% strength in butylglycol | | 3.550 |
| 10.542 | (b) basic lead silicate paste/75% strength in demineralized water (EP 202) | | 10.542 |
| 1.692 | (c) ®Printex 25 (coloring carbon) | | 1.480 |
| 5.086 | Dibutyltin oxide | | 14.834 |
| 79.130 | (d) Titanium oxide RSE 50 | | 69.594 |
| 100.000 | | | 100.000 |

Pigment pastes:

| Example | Paste resin according to | Pigment composition | PBV | Solid 1 h, 125° C.) |
|---|---|---|---|---|
| IV. 1. | (A) 3. | A | 12:1 | 80% |
| IV. 2. | (A) 3. | B | 18:1 | 70% |
| IV. 3. | II. (Comp.) | A | 12:1 | 80% |
| IV. 4. | II. (Comp.) | B | 35:1 | 70% |

(a) Air Products and Chemicals Inc.
(b) Heubach
(c) Degussa AG
(d) Bayer AG

The paste resins were ground according to the above recipe in a bead mill in a manner known to the person skilled in the art (see also German Patent Application P 37 26 497.4) and then adjusted for solid using demineralized water in order to assure an appropriate handability.

All pastes possessed virtually no thixotropic behavior and had viscosities at $D = 50 \text{ s}^{-1}$ of 300 to 450 mPa.s and at $D = 100 \text{ s}^{-1}$ of 150 to 250 mPa.s. The pastes showed no detectable change in viscosity or drying out of the pigments even on storage (4 weeks, room temperature).

b) The pastes were then added to a diluted clear paint (20% strength aqueous solution) of the low-solvent electrocoating paint binder dispersions described under III.3. and then adjusted with demineralized water to 18% solid (1 h, 125° C.). The sieve residue was then determined after 24 hours, 14 days and 4 weeks (stirring at room temperature) and an "L-shaped panel coating" was carried out.

The test combination 1 to 8 was subjected to cataphoretic deposition in an open glass vessel. The substrates mentioned were used as the cathode and blank steel, at a distance of from 5 to 10 cm from the cathode, as the anode. The bath temperature was 28° C. and the duration of deposition was 2 min.

The surface assessments were carried out on the cured films (baking conditions: 20 min, object temperature of 180° C.) having a theoretical film thickness of 20 μm on B.1. The results are summarized in Table 4 below:

The abbreviations in the Table have the following meaning:

| pass | coating satisfactory, no sedimentation phenomena |
|---|---|
| SM | slight matting |
| M | matt film, still no process interference |
| S | distinct sedimentation phenomena |
| fail | film unusable |
| Al | aluminum |
| B1 | Bonder 132 |
| B2 | Bonder 26 |
| B3 | Bonder 26 - galvanized |
| PBR | pigment/binder ratio |
| P | peaks (partly assessed under a miscroscope) |
| C | craters |
| D | depressions |
| O | overcoating |
| B | coating break-up |
| E | edge crawling |

The coating on the various substrates (A1, B1, B2, B3) was carried out under identical deposition conditions and should not show any differences ($=2$ μm) in the film thickness (about 20 μm). Flow-out, edge covering and matting of the film must also be satisfactory.

It can be seen from Table 4 that the pigment pastes according to the invention satisfy the requirements regarding stability and coating behavior. The experiments carried out with the comparison pastes (especially 6.5) indicate that the pastes are less satisfactory in respect of sieve residue and L-shaped panel test and that the high pigment-binder ratios tend to have an adverse effect (PBR about 35:1).

Virtually identical results were obtained when, instead of the paste resin A) 3, one was employed in which another epoxy resin, such as, for example, Epikote 1002, was used instead of Epikote 1001 in step A) 1 or N,N-dimethylethanolamine instead of triethylamine in step A) 2.

The same also applies when using the paste resin B) instead of the paste resin A).

TABLE 4

| Test combination | Clear coat dispersion | Pigment paste | PBR of the paint | Sieve residue after | | | L-shaped panel test after | | | Coating on | | | |
|---|---|---|---|---|---|---|---|---|---|---|---|---|---|
| | | | | 24 h | 14 days | 4 wks. | 24 h | 14 days | 4 wks | A1 | B1 | B2 | B3 |
| 1 | I | IV. 1. | 0.4:1 | 10 | 20 | 20 | to pass | to pass | to pass | to pass | to pass | to pass | to pass |
| 2 | I | IV. 2. | 0.5:1 | 20 | 30 | 50 | to pass | to pass | LM | to pass | to pass | to pass | P |
| 3 | I | IV. 3. | 0.4:1 | 30 | 50 | 100 | to pass | LM | LM | P, U | to pass | to pass | P, K |

TABLE 4-continued

| Test combination | Clear coat dispersion | Pigment paste | | PBR of the paint | Sieve residue after 24 h | Sieve residue after 14 days | Sieve residue after 4 wks. | L-shaped panel test after 24 h | L-shaped panel test after 14 days | L-shaped panel test after 4 wks | Coating on A1 | Coating on B1 | Coating on B2 | Coating on B3 |
|---|---|---|---|---|---|---|---|---|---|---|---|---|---|---|
| 4 | I | IV. 4. | Comp. | 0.5:1 | 30 | 80 | to fail | to pass | S | S | P | to pass | to pass | P, K |
| 5 | II | IV. 1. | | 0.4:1 | 30 | 50 | 80 | to pass | to pass | to pass | to pass | to pass | to pass | to pass |
| 6 | II | IV. 2. | | 0.5:1 | 50 | 50 | 80 | to pass | LM | M | to pass | to pass | to pass | P |
| 7 | II | IV. 3. | Comp. | 0.4:1 | 50 | 80 | 180 | to pass | S | S | U | to pass | D | P, K |
| 8 | II | IV. 4. | | 0.5:1 | 40 | 100 | 200 | M | S | fail | | to pass | to pass | P, U |

We claim:

1. A paste resin based on an epoxy compound, this paste resin containing
   (a) quaternary ammonium groups of the formula (Ia)

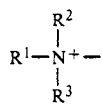

in which the radicals $R^1$ to $R^3$ independently of one another represent a hydrocarbon radical having 1 to 7 carbon atoms, or two of these radicals form a cyclo-aliphatic ring, or quaternary ammonium groups of the formula (Ib)

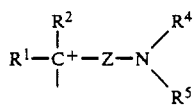

in which the radicals $R^1$ and $R^2$ have the meaning above,
   represents a linear, branched or cyclic alkylene radical having 2 to 18 carbon atoms, which may optionally carry OH groups and/or contain oxygen atoms, and
   $R^4$ and $R^5$ independently of one another denote a hydrocarbon radical having 2 to 50 carbon atoms, which may optionally carry OH and/or silane groups and/or contain oxygen atoms, or one of the two radicals $R^4/R^5$ may form a ring, or mixtures of the groups (Ia) and (Ib),
   (b) OH groups and
   (c) urethane groups and of which at least 10 mol% are derived from a long-chain, monofunctional isocyanate having at least 8 carbon atoms,
the mean molecular weight ($M_n$) of these paste resins being 500 to 10,000.

2. The paste resin as claimed in claim 1, wherein this paste resin on average contains 1 to 4 of the groups (a) per molecule.

3. The paste resin as claimed in claim 1, wherein the number of groups (b) on average is 1 to 20 per molecule.

4. The paste resin as claimed in claim 1, wherein the number of groups (c) in the molecule is 1 to 15 per molecule.

5. The paste resin as claimed in claim 1, wherein the isocyanate radicals (c) are derived from monoisocyanates having 8 to 22 carbon atoms or from partly masked polyisocyanates having a total carbon number of 10 to 50.

6. The paste resin as claimed in claim 1, wherein the average molecular weight ($\overline{M}n$) is 1,000 to 5,000.

7. The paste resin as claimed in claim 1, wherein the radicals $R^1$ to $R^3$ in the formula (Ia) independently of one another stand for a hydrocarbon radical having 1 to 7 carbon atoms which carries OH-groups and/or amino groups as substituents.

8. The paste resin as claimed in claim 1, wherein the radicals $R^1$ to $R^3$ in the formula (Ia) independently of one another stand for a hydrocarbon radical having 1 to 7 carbon atoms which carries oxygen atoms.

9. The paste resin as claimed in claim 1, wherein the radicals $R^1$ to $R^3$ in the formula (Ia) independently of one another stand for a hydrocarbon radical which carries OH groups and/or amino groups and which contains oxygen atoms.

10. The paste resin as claimed in claim 1, wherein the OH values of these are 10 to 200 mg of KOH/g.

11. The paste resin as claimed in claim 1, wherein the epoxy numbers of these are below 0.5.

12. The paste resin as claimed in claim 1, wherein the amount of quaternary nitrogen is 0.2 to 20 milliequivalents per gram.

13. The paste resin as claimed in claim 1, wherein the amount of isocyanate radicals (A) is 3 to 50% by weight.

14. A process for the preparation of the paste resin as claimed in claim 1, wherein compounds (B) which contain at least one 1,2-epoxy group and OH groups are first made to react with long-chain, monofunctional isocyanates (D1), either as such or mixed with partly masked isocyanates (D2), and this reaction product is then reacted with amines (A) under conditions which lead to quaternary amino groups.

15. A process for the preparation of paste resins as claimed in claim 1, wherein compounds (B) which contain at least one 1,2-epoxy group are first made to react with amines (A), the reaction product (C) resulting from this is then reacted with long-chain, monofunctional isocyanates (D1), optionally mixed with partly masked isocyanates (D2), and the quaternization is carried out subsequently thereto.

16. The process as claimed in claim 14, wherein as amines (A), those of the formula (III) are employed,

in which $R^1$ and $R^2$ are as defined in formula (Ia) and X stands for $R^3$ as in formula (Ia) or for hydrogen.

17. The process as claimed in claim 14, wherein as compounds (B) those of the formula (IV)

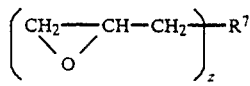

are employed in which:

$R^7$ denotes a z-valent radical of a polyether, polyether polyol, polyester, polyester polyol which can also optionally contain ($NR^8$) groups, $R^8$ representing hydrogen, alkyl of 1 to 14 carbon atoms or hydroxyalkyl of 1 to 14 carbon atoms, or a z-valent hydrocarbon radical of 2 to 18 carbon atoms which can optionally carry inert or noninterfering groups, or a z-valent poly(sec.)amine radical or the z-valent radical of a reaction product of an epoxycarbonate compound with polyamines, polyols, polycaprolactone polyols, OH group-containing polyesters, polyethers, polyglycols, hydroxyl-function-, carboxyl function- and amino function-containing polymeric oils having average molecular weights $M_n$ of 800 to 10,000, polycarboxylic acids, hydroxyl function- or amino function-containing polytetrahydrofurans, and of reaction products of polyamines with glycidyl esters of α,α-dialkylalkanemonocarboxylic acids having the empirical formula $C_{12-14}H_{22-26}O_3$ or with glycidyl versatate, and z denotes 1 to 5.

18. The process as claimed in claim 14, wherein (A) and (B) are employed in such amounts that the equivalent ratio of amino groups reacting with epoxy groups to epoxy groups is 0.8–1.3 to 1.

19. The process as claimed in claim 14, wherein long-chain monoisocyanates having 8 to 22 carbon atoms are employed as the long-chain, monofunctional isocyanates (D1).

20. The process as claimed in claim 14, wherein the amount of isocyanate (D1) is 50 to 100 mol-% and the amount of isocyanate (D2) is 0 to 50 mol-%.

21. The process as claimed in claim 15, wherein as amines (A) those of the formula (III)

are employed in which $R^1$ and $R^2$ are as defined in formula (Ia) and X stands for $R^3$ as in formula (Ia) or for hydrogen.

22. The process as claimed in claim 15, wherein (A) and (B) are employed in such amounts that the equivalent ratio of amino groups reacting with epoxy groups to epoxy groups is 0.8–1.3 to 1.

23. The process as claimed in claim 15, wherein long-chain monoisocyanates having 8 to 22 carbon atoms are employed as the long-chain, monofunctional isocyanates (D1).

24. The process as claimed in claim 15, wherein the amount of isocyanate (D1) is 50 to 100 mol-% and the amount of isocyanate (D2) is to 0 to 50 mol-%.

25. A pigment paste containing the paste resin as claimed in claim 1 and a pigment dispersed therein.

* * * * *